AUTOMATIC TELEPHONE ANSWERING APPARATUS

Filed Feb. 10, 1960 3 Sheets-Sheet 1

Kenneth A. Catto
H Albert Campbell, Jr.
INVENTORS

BY Oliver D. Olson
Agent

Jan. 18, 1966 K. A. CATTO ETAL 3,230,312

AUTOMATIC TELEPHONE ANSWERING APPARATUS

Filed Feb. 10, 1960 3 Sheets-Sheet 2

Kenneth A. Catto
H Albert Campbell, Jr.
INVENTORS

BY Oliver D. Olson

Agent

AUTOMATIC TELEPHONE ANSWERING APPARATUS

Filed Feb. 10, 1960 3 Sheets-Sheet 3

Kenneth A. Catto
H Albert Campbell, Jr.
INVENTORS

BY Oliver D. Olson
Agent

United States Patent Office 3,230,312
Patented Jan. 18, 1966

3,230,312
AUTOMATIC TELEPHONE ANSWERING APPARATUS

Kenneth A. Catto, Beaverton, and H. Albert Campbell, Jr., Portland, Oreg., assignors, by mesne assignments, to K.W.F. Industries, Inc., a corporation of Washington Filed Feb. 10, 1960, Ser. No. 7,943
6 Claims. (Cl. 179—6)

This invention pertains to apparatus for the automatic answering of telephone calls, and relates particularly to a novel mechanical assembly and control circuit for such apparatus.

It is a principal object of the present invention to provide automatic telephone answering apparatus, which is of simplified construction for compact design and economical manufacture, providing long and faithful operation with a minimum of maintenance and repair.

Another important object of this invention is the provision of automatic telephone answering apparatus in which the electrical circuitry includes but a single actuating relay.

Another important object of this invention is the provision of automatic telephone answering apparatus in which is included novel means for initiating the operation cycle automatically upon completion of the telephone line circuit by a calling party.

Still another important object of the present invention is to provide, in automatic telephone answering apparatus, novel timing means by which to recycle an information message for play out to subsequent calling parties.

A further important object of this invention is to provide in automatic telephone answering apparatus, a novel tape spool assembly which compensates automatically for variations in tape speed with variations in diameters of tape coil as the tape is transferred between the supply and take-up spools.

A still further important object of the present invention is to provide, in automatic telephone answering apparatus, novel means for attaching the ends of a tape to the supply and take-up spools so as to afford quick release of the tape ends from the spools.

A further important object of this invention is the provision, in automatic telephone answering apparatus of means which functions to activate the apparatus only after a complete telephone ring, thus affording normal telephone action to which a calling party is accustomed.

The foregoing and other objects and advantages of this invention will appear from the following detailed description, taken in connection with the accompanying drawings, in which.

Figure 1:
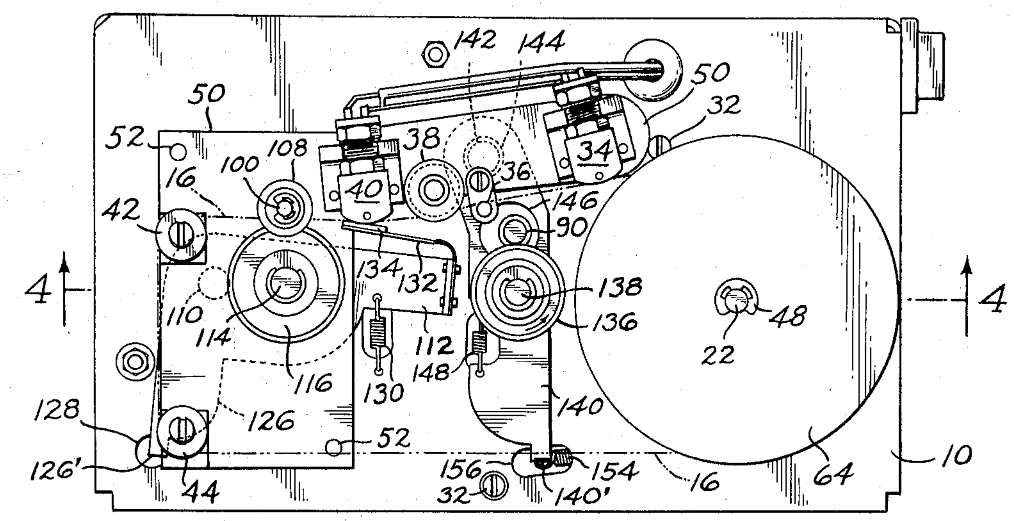
FIG. 1 is a view in side elevation of the front side of the main mechanical assembly of an automatic telephone answering apparatus with which the control circuit of the present invention may be employed.
Figure 2:
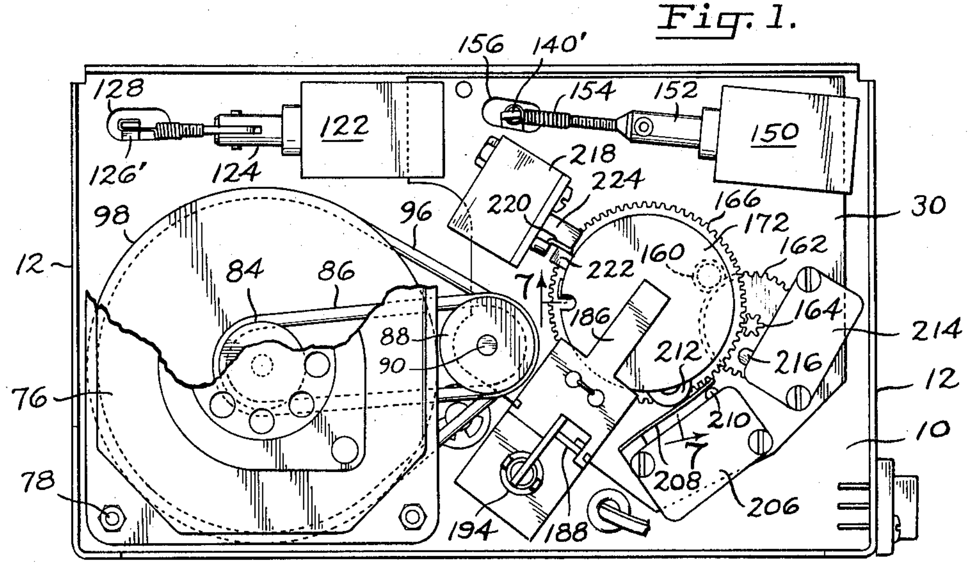
FIG. 2 is a view in side elevation of the back side of the mechanical assembly shown in FIG. 1, portions thereof being broken away to disclose details of internal construction.

The mechanical assembly of the apparatus is supported upon a frame which includes a main deck plate 10 having offset end sections 12 provided with inwardly projecting tabs 14 for securing the frame to an instrument chassis. Although the deck plate may be disposed horizontally on a chassis, the construction illustrated is designed for mounting the deck plate in the vertical plane illustrated in FIG. 2. However, since the components of the apparatus shown in FIG. 1 must be exposed for manipulation of the magnetic tape, this side of the deck plate is referred to hereinafter as the top side, and the side shown in FIG. 2 is referred to as the underside.

The telephone answering apparatus employs a conventional magnetic tape 16 of wire or, preferably, of coated synthetic plastic for recording an information message to be played back to subsequent callers automatically as the telephone calls are received. The coil of magnetic tape is contained initially upon a supply spool 18 (FIG. 4), the hollow hub 20 of which is removably secured to a spool-driven shaft 22, as by means of the interengagement of the pin 24 projecting radially from the shaft and the notch 26 formed in the spool hub. The shaft bearing 28 is secured to the sub-deck plate 30 which is mounted on the underside of the main deck plate by means of screws 32.

The outer end of the magnetic tape is passed first over a conventional erase head 34, thence between a pair of guide posts 36, 38 and over a conventional record-play head 40, and thence around a pair of spaced guide posts 42, 44 for attachment to the take-up spool 46 mounted freely on the spool-driven shaft for rotation independently of the supply spool. A split keeper 48 is mounted removably in an annular groove in the top end of the shaft to prevent axial displacement of the spools.

The erase head and record-play head, in addition to the guide posts, are mounted upon a super-deck plate 50 which is supported by the main deck plate and in spaced relation thereto by means of the screws 52 and interposed sleeves 54.

Figure 3:
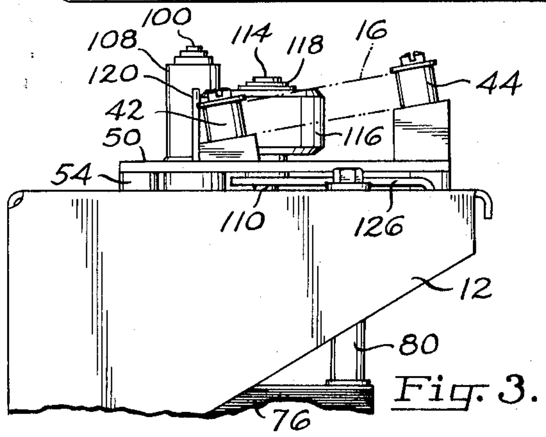
FIG. 3 is a fragmentary view in end elevation as viewed from the left in FIG. 1, the magnetic tape being shown in dash lines.

The guide posts may be idling rollers, or they may be non-rotatable posts made of nylon or other smooth surface material. Additionally, the spaced guide posts are mounted angularly (FIG. 3) with respect to the supporting super-deck plate and at corresponding elevations in order to afford proper transfer of the magnetic tape between the supply and take-up spools.

Figures 4, 5, 6, 7, 8, 9, 10:
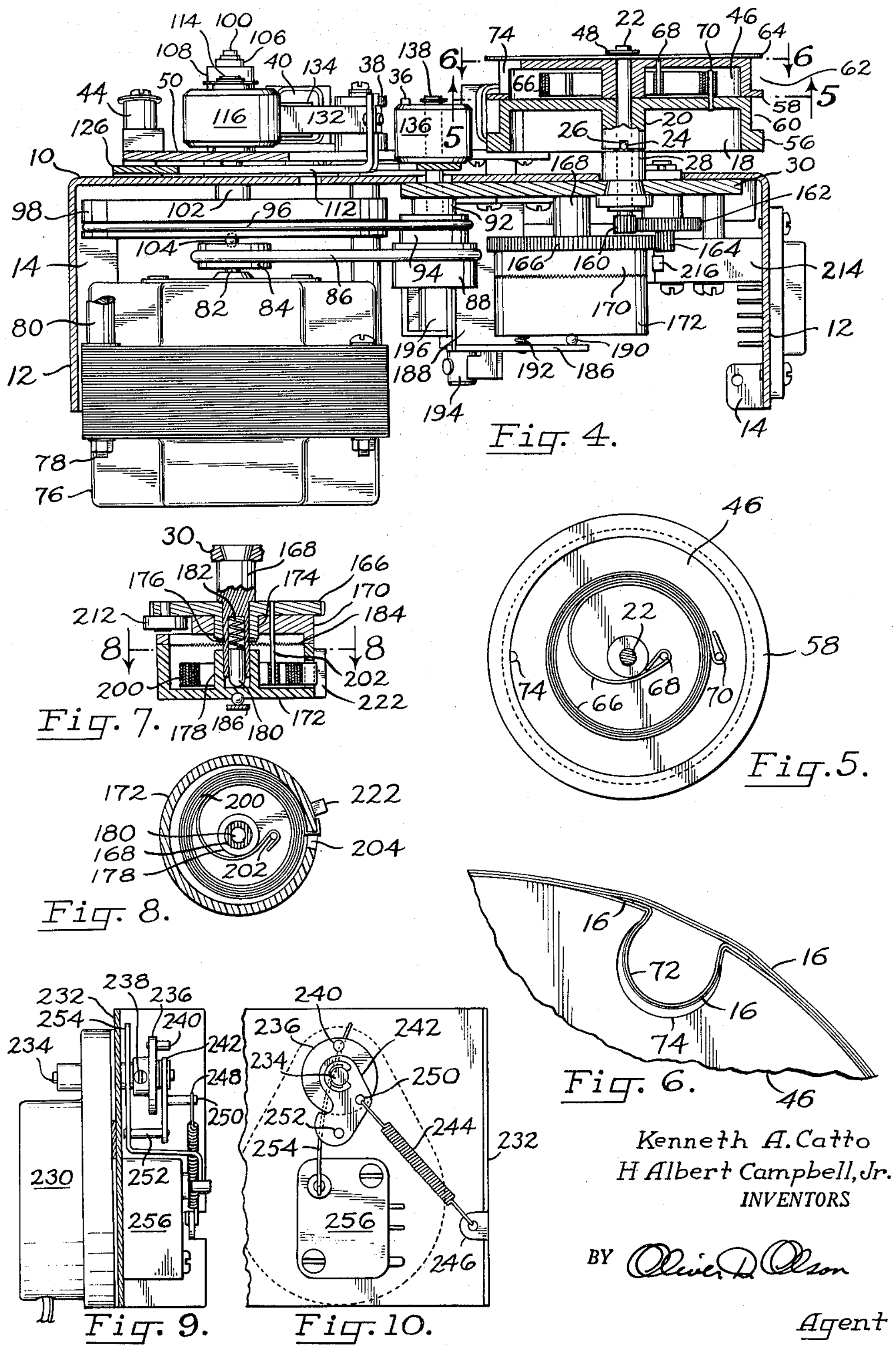
FIG. 4 is a sectional view taken along the line 4—4 in FIG. 1.
FIG. 5 is a sectional view taken along the line 5—5 in FIG. 4.
FIG. 6 is a fragmentary plan view from the line 6—6 in FIG. 4 and showing one means for releasably securing the end of a magnetic tape to one of the tape spools.
FIG. 7 is a sectional view taken along the line 7—7 in FIG. 2.
FIG. 8 is a sectional view taken along the line 8—8 in FIG. 7.
FIG. 9 is a view in side elevation of an automatic start switch assembly embodying features of the present invention.
FIG. 10 is a fragmentary view in front elevation of the start switch assembly shown in FIG. 9.

The preferred construction of the supply and take-up spool assembly is best illustrated in FIG. 4. The supply spool 18 is provided at its inner end with a peripheral flange 56 which, as explained more fully hereinafter, serves as a rewind drive flange. The inner end of the take-up spool 46 also is provided with a peripheral flange 58, and this flange cooperates with a supply spool flange to provide an annular groove 60 which confines the coil of magnetic tape on the supply spool. A similar annular groove 62 is provided for the take-up spool by the peripheral flange 58 and the outwardly spaced disc 64 which is mounted freely upon the shaft 22 under the split keeper 48.

Means is provided for compensating for variations in rotational speed of the supply and take-up spools with variations in diameters of the coils of magnetic tape, as the latter is transferred from one spool to the other. Referring to FIGS. 4 and 5 of the drawings, the hollow take-up spool 46 houses a coil spring 66, the reversely bent inner end of which engages a pin 68 secured to the take-up spool adjacent its central hub. The reversely bent outer end of the coil spring engages a pin 70 secured to the supply spool 18 and projecting into the hollow take-up spool. Thus, as the supply spool is rotated at a constant speed in either of the feed and rewind directions described hereinafter, the take-up spool is permitted to rotate at a greater or lesser speed depending upon the relative diameters of the tape coils on the two spools.

It is desirable that the opposite ends of the magnetic tape be attached to the supply and take-up spools, respectively, in such manner that they will become detached from the spools in the event the latter are rotated to the ends of the tape, thus averting possible damage to the tape drive motor. Referring to FIG. 6 of the drawings, releasable attachment of the magnetic tape is provided by a U-shaped resilient clip 72 which is adapted to be received frictionally within a slot 74 provided in the peripheral wall of the spool. The end of the magnetic tape 16 is laid over this slot and the resilient clip then pushed into the slot, thereby gripping the end of the tape frictionally between the clip and the side walls of the slot. Thus, as the tape is unwound from the spool the force exerted by the drive motor is sufficient to unseat the clip and release the tape. It will be understood that this clip and slot arrangement is utilized on each of the spools for releasably attaching the opposite ends of the tape.

The mechanical assembly provided for driving the magnetic tape in the forward feed direction, for recording or play-back of an information message, now will be described.

An electric drive motor 76 is supported on the underside of the main deck plate by means of the screws 78 and spacer sleeves 80. The driven shaft 82 of the motor terminates below the plate and carries a pulley 84 for the belt 86. This belt also is reeved over another pulley 88 which is secured to the shaft 90 mounted for rotation in the bearing 92 supported by the sub-deck plate 30.

Also secured to the shaft 90 is a second pulley 94 which receives the belt 96. This belt also is reeved about a peripheral groove in the flywheel 98 which is secured to a capstan shaft 100 mounted for rotation in the bearing 102 secured to the main deck plate. Although the capstan shaft and the motor shaft 82 are in axial alignment, they are spaced from each other. Axially aligned pockets in the adjacent surfaces of the motor shaft pulley 82 and the flywheel receive a ball bearing 104 for purposes of increasing the stability of the flywheel.

The capstan shaft projects outwardly from the top side of the main deck plate and is positioned for engagement by the magnetic tape between the record-play head 40 and the guide post 42. Its top end is journaled in a bearing 106 supported at the upper end of a hollow post 108 mounted upon the super-deck plate 50. The space provided between the main deck plate 10 and this super-deck plate receives a bell crank lever which is pivoted intermediate its ends on the pivot pin 110 secured to the main deck plate. Secured to one arm 112 of the bell crank lever is a pressure roll shaft 114 which projects outwardly through an opening in the super-deck plate. This shaft freely supports a pressure roll 116, the latter being confined against axial displacement by means of the split keeper 118. An intermediate segment of the post 108 supporting the capstan shaft is cut away to provide an opening 120 which exposes the capstan shaft for frictional engagement by the pressure roll when the bell crank lever is rotated counter-clockwise (FIG. 1) to the tape-feeding position. This movement is effected by operation of the forward feed solenoid 122 which is mounted upon the sub-deck plate 30. The retractable armature 124 of this solenoid is connected to the second arm 126 of the bell crank lever, the end position 126' of this arm extending through an opening 128 in the main deck plate.

The pressure roll 116 normally is held out of pressure engagement with the capstan shaft 100 by means of the coil spring 130 which interconnects the main deck plate and the bell crank lever in such manner as to urge the latter resiliently to its position of clockwise rotation.

The pressure roll is wider than the magnetic tape 16, and hence when the bell crank lever is rotated to the tape-feeding position the exposed portions of the pressure roll are brought into frictional engagement with the capstan shaft 100. Thus, as the capstan shaft is rotated by the flywheel connection to the drive motor 76, the pressure roll is caused to rotate therewith, and the frictional engagement of the pressure roll with the magnetic tape causes the latter to be pulled from the supply spool 18. The tape thus is drawn past the erase and record-play heads and thence wound upon the take-up spool 46 which is caused to rotate with the supply spool by virtue of a resilient interconnection described hereinbefore.

In order to assure positive and uniform pressure of the magnetic tape against the record-play head 40, a resilient pressure bar 132 is mounted at one end on the offset end of the bell crank lever arm 112. The opposite end of the pressure bar supports a felt pad 134 which is positioned adjacent the record-play head and is pressed against the latter, with the magnetic tape interposed therebetween, when the bell crank lever is rotated counter-clockwise to its tape-feeding position.

The mechanical assembly provided for driving the magnetic tape in the rewind direction, preparatory to playing back a recorded information message, now will be described.

The shaft 90 extends through the main deck plate for abutment by the rewind tape spool roll 136. This roll is mounted for rotation on the upstanding shaft 138 secured to the lever 140 intermediate the ends of the latter. The lever is mounted pivotally at one end on the pivot pin 142 which is secured to the main deck plate and extends through an opening 144 in the lever. This opening is larger than the pivot pin, whereby to permit limited longitudinal movement of the lever in the radial direction of the pivot pin. An enlarged opening 146 in the lever receives the shaft 90 freely therethrough for accommodating pivotal motion of the lever. A coil spring 148 interconnects the lever and main deck plate in such manner as to urge the rewind roll 136 resiliently against the shaft 90.

A rewind solenoid 150 is mounted upon the sub-deck plate 30, and its retractable armature 152 is connected through a resilient spring 154 to the offset end 140' of the lever 140. This offset end projects through registering openings 156 in the deck plates. As explained more fully hereinafter, retraction of the solenoid armature causes the lever to pivot counter-clockwise (FIG. 1), whereupon the rewind roll 136 is drawn into driving engagement with the peripheral flange 56 of the tape supply spool 18. Retraction of the lever upon deenergization of the solenoid, is effected by spring 148, assisted by the rotating shaft 90 which exerts a force on the roll 136 in the direction tending to retract the latter from the supply spool.

Means also is provided for measuring the length, or time of an information message as it is recorded on the magnetic tape, and for controlling the rewind and playback of the message. A pinion gear 160 is secured to the bottom end of the spool driven shaft 22, and this gear engages a spur gear 162 mounted rotatably in a bearing secured to the sub-deck plate. The spur gear carries a coaxial pinion gear 164 which meshes with a second spur gear 166 mounted for rotation on the stub shaft 168 secured to the sub-deck plate.

The second spur gear 166 supports a cylindrical timer clutch section 170 for rotation therewith. A cooperating timer clutch section 172 is associated therewith, but is arranged for axial and rotational displacement relative thereto. The structural details of this assembly is best illustrated in FIGS. 7 and 8. The spur gear 166 is provided with a hollow hub 174 mounted rotatably on the lower reduced section of the stub shaft 168 and retained thereon by means of the keeper ring 176 mounted removably in an annular groove in the shaft. The central hollow hub 178 of the other clutch section 172 is received freely over the end of the stub shaft, whereby to retain the clutch sections in axial alignment. This end of the shaft is hollow and receives a plunger 180 slidably therein, resiliently backed by a coil spring 182. The projecting end of the plunger engages the clutch section 172 to urge the latter resiliently away from the cooperating clutch section 170, to effect disengagement of the cooperating teeth 184 formed on the facing edges of the clutch sections.

Axial displacement of the clutch sections by the spring loaded plunger 180 is resisted by a lever arm 186 (FIG. 4) which is mounted pivotally intermediate its ends on a bracket 188 projecting from the sub-deck plate. One end of this arm underlies the clutch section 172 and engages the latter through a ball bearing 190 confined in a detent formed in the clutch section. A coil spring 192 interengages the lever arm and sub-deck plate in such manner as to urge the clutch section 172 into engagement with the other clutch section 170.

The opposite end of the lever arm 186 is attached to the retractable armature 194 of the electrically actuated solenoid 196 which is mounted upon the bracket 188. As explained more fully hereinafter, this solenoid functions, upon activation, to rotate the lever arm clockwise (FIG. 4), against the resistance of the spring 192, and thus permit the spring-loaded plunger 180 to force the clutch section 172 out of engagement with the other clutch section 170.

Means also is provided for effecting rotation of the clutch sections relative to each other, when the sections are disengaged. In the embodiment illustrated and best shown in FIGS. 7 and 8, a coil spring 200 encircles the hub 178 of the clutch section 172. The inner end of the spring engages a pin 202 mounted on the clutch section 170 and projecting into the clutch section 172. The opposite end of the coil spring extends outwardly through a slot 204 in the clutch section 172 and is bent at its outer end to prevent its disengagement from the opening.

A rewind limit switch 206 (FIG. 2) is mounted upon the sub-deck plate adjacent the timer clutch. A resilient strap 208 is mounted at one end of the limit switch and its opposite overlies the switch button 210. A roller cam 212 is mounted on the clutch section 170, and this roller is so arranged that during rotation of the clutch section it engages the protective strap 208 and thus actuates the switch button of the rewind limit switch.

Also mounted adjacent the timer clutch is a safety switch 214, the actuating button 216 of which is disposed for engagement by the roller cam 212 during rotation of the clutch section 170.

A rewind start switch 218 is mounted on a bracket secured to the sub-deck plate, and its actuating arm 220 is disposed adjacent the timer clutch for engagement by the projection 222 on the clutch section 172. This projection also is arranged to engage a mechanical stop 224 projecting from the bracket supporting the rewind start switch, to prevent further rotation of the clutch section.

In the mode of operation afforded by the circuit shown in FIG. 11 and described in detail hereinafter, automatic actuation of the components of the apparatus is achieved by utilizing the ringing voltage which is developed on the telephone lines when the calling party has completed the telephone line circuit. As explained more fully hereinafter, this ringing voltage functions to drive an electric motor 230 (FIGS. 9 and 10) which is mounted upon a bracket 232 supported by the chassis of the telephone answering apparatus. The driven shaft 234 of this motor extends through an opening in the bracket and carries a wheel 236, secured thereto by means of the set screw 238.

A projecting pin 240 on the wheel is arranged, during rotation of the wheel, to intercept a switch actuating arm 242 which is mounted at one end freely on the motor shaft 234 for rotation independently of the latter. The arm is maintained in a normal rest position by means of the resilient spring 244. One end of the spring is attached to a projecting tab 246 on the bracket. The opposite end of the spring is provided with a hook 248, and this hook is received slidably in an annular groove formed in a pin 250 projecting from the arm.

The outer end of the arm 242 projects beyond the periphery of the wheel 236, and this outer end supports a pin 252 which is arranged, during rotation of the arm, to intercept the actuating lever 254 of the automatic start switch 256 mounted on the bracket.

As the wheel 236 is rotated in the counterclockwise direction, as viewed in FIG. 10, the pin 240 engages the arm 242 and thus rotates the latter with it. As the spring attaching pin 250 moves counterclockwise across the line extending through the tab 246 and the motor driven shaft 234, 180° from the normal rest position of the pin 250, the tensioned spring 244 thereupon rotates the arm quickly counterclockwise back to the normal rest position illustrated. During this rotation of the arm 242, the pin 252 intercepts the switch actuator lever 254 and rotates it counterclockwise momentarily to close the automatic start switch 256. Thus, it will be seen that this switch is actuated once during each cycle of rotation of the wheel 236. The mode of operation of the apparatus afforded by the circuit shown in FIG. 11, now will be described.

Figure 11:
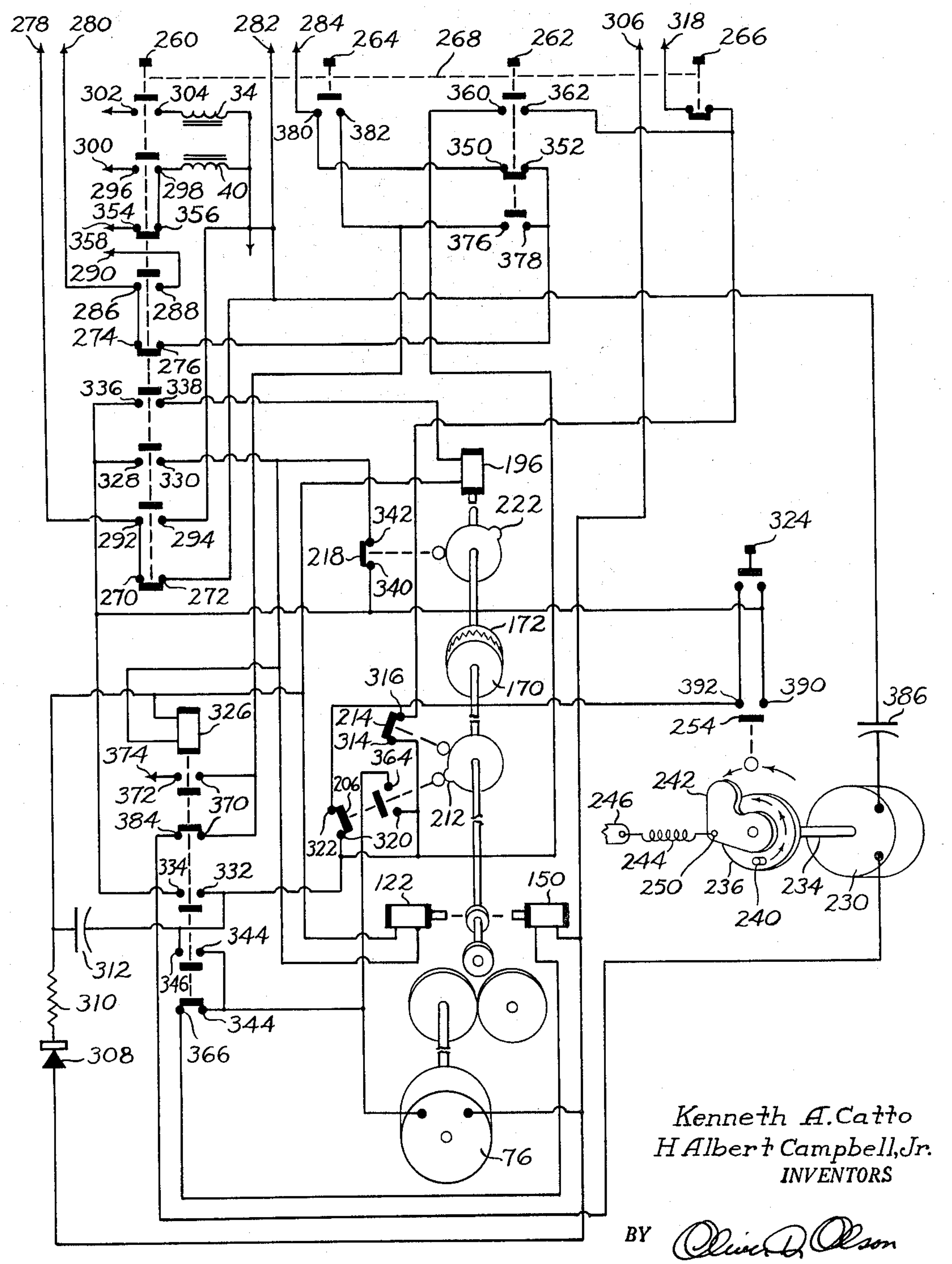
FIG. 11 is a schematic diagram of a control circuit embodying features of the present invention, and including certain of the components of the mechanical assembly shown in the preceding figures.

In FIG. 11 of the drawings, there is illustrated schematically a plurality of electric push button switches, namely a record switch 260 by which the mechanism is activated to enable the recording of an information message on the magnetic tape for subsequent callers; a test switch 262 by which to play back the recorded information message; an automatic switch 264 by which to set the mechanism in readiness for automatic operation for incoming calls; and an on-off switch 266 through which electric power is supplied to the apparatus. These push button switches are interlocked mechanically, as indicated by the dash line 268, so that depressing any one of them automatically releases the others to the extended position. All of the push buttons are shown in FIG. 11 in extended position, and in this position the on-off switch is closed.

In order to record an information message on the magnetic tape for play-out to subsequent calling parties, the recording party depresses the record push button 260. Opening of the contacts 270, 272, and 274, 276 disconnect the telephone hand set terminals 278 and 280 from the telephone line terminals 282 and 284. Closing of the contacts 286, 288 connects the telephone hand set microphone-receiver terminal 280 to the input terminal 290 of the audio amplifier, while closing of the contacts 292, 294 completes the electric circuit of the common terminal 278 of the hand set. Closure of contacts 296, 298 connects the audio amplifier output terminal 300 to the record-play head coil 40, while closure of contacts 302, 304 completes the electric circuit of the erase head coil 34.

Certain of the electrical components to be described hereinafter are operated by direct current, and this source is provided, in the embodiment illustrated, by an electric circuit leading from the alternating current input terminal 306 through the rectifier 308, resistance 310 and condenser 312, thence through the normally closed contacts 314, 316 of the safety switch 214 and the closed contacts of the on-off push button switch 266 to the other terminal 318 of the supply. The source of direct current thus is present across the condenser 312.

Assuming the magnetic tape to be completely rewound, with the rewind limit switch 206 held by the associated roller 212 in a position closing the contacts 320 and 322, the operator then depresses the start switch 324. This completes the direct current circuit of the forward relay coil 326 from the positive side of the condenser 312, through the forward relay coil and the closed contacts 328, 330 of the depressed record push button switch, which have shorted the opened contacts of the rewind start switch 218, thence through the closed contacts of the start-switch 324 and rewind limit switch 206, to the negative side of the condenser.

Upon activation of the forward relay coil, the contacts 332, 334 associated therewith are closed, thus forming a holding circuit which parallels the series arrangement of start switch 324 and rewind limit switch contacts 320 and 322, to maintain the closed circuit of the forward relay coil 326. These closed contacts also maintain the completed circuit of the forward solenoid 122 which is arranged in parallel with the forward relay coil.

Closure of contacts 332, 334 also maintains the completed direct current circuit of the record solenoid 196 from the positive side of the condenser 312 through the record solenoid and the closed contacts 336, 338 of the depressed record push button switch 260, thence through the closed contacts 332, 334 to the negative side of the condenser 312. Activation of the cord solenoid causes the associated lever arm 186 to pivot clockwise (FIG. 4), permitting disengagement of the clutch sections 170, 172 by the force exerted by the spring loaded plunger 180 (FIG. 5). The coil spring 200 thereupon rotates the timer clutch section 172 to the position at which the projection 222 engages the rewind start switch 218 and opens the contacts 340, 342. However, as previously mentioned, these opened contacts are shorted by the closed contacts 328, 330 of the depressed record push button switch 260, for purposes described more fully hereinafter.

Activation of the forward relay coil 326 also effects closure of the contacts 344, 346 to complete the alternating current circuit from the supply terminal 306 through the electric drive motor 76 and said closed contacts, thence through the closed contacts of the safety switch 214 and the on-off switch 266 to the other terminal 318 of the supply. Thus, with the motor effecting rotation of the capstan shaft 100 and the forward solenoid 122 holding the pressure roll 116 against the rotating capstan shaft, the magnetic tape 16 is driven in the forward direction. The information message now may be placed upon the tape by speaking into the microphone of the telephone hand set.

If the information message exceeds a predetermined allotted time, established by the time required for the cam 212 to rotate, clockwise in FIG. 2 and counterclockwise in FIG. 11, into engagement with the safety switch 214, the contacts of the latter are opened. The electric circuit of the rectifier 308 thus is broken, and the resulting loss of direct current supply causes deactivation of the forward relay coil 326, the record solenoid 196 and the forward solenoid 122. The drive motor 76 also is deenergized by opening of contacts 344, 346 of the deenergized forward relay coil. Although the time period for the information message may be varied as desired, a period of three minutes has been found to be quite suitable.

In the event of failure of the safety switch 214, permitting the drive motor 76 to continue rotation until the tape 16 has been drawn from the supply spool 18, the clip 72 will be pulled from the slot 74 and the tape released, to prevent damage to the drive motor 76.

When the information message has been completed, the apparatus may shut off by depressing the on-off push button switch 266. This breaks the circuit of the alternating current supply which, in turn, eliminates the source of direct current to the forward relay coil, the record solenoid and the forward soleniod.

Upon deactivation of the record solenoid 196, the clutch sections 170, 172 are drawn together by the force of the coil spring 192. The arcuate distance thus established between the positions of the cam roller 212 and the projection 222, represents the length of the recorded information message.

If the recording party desires to play back the recorded information message for review, the test push button switch 262 is depressed, thereby automatically releasing the record push button switch 260 to the extended position shown in FIG. 11. In this released position of the record push button switch, the formerly opened contacts 270, 272 and 274, 276 are closed. However, upon depressing the test push button switch, the closed contacts 350, 352 are opened to again disconnect the telephone hand set terminal 280 from the telephone line terminal 284.

In the released position of the record push button switch, the contacts 354, 356 are closed, connecting the record-play head coil 40 to the input terminal 358 of the playback amplifier.

With the test push button depressed, switch contacts 360, 362 are closed, thus providing a short circuit for the safety switch contacts 314, 316 in the event the latter have been opened. A circuit thus is completed from the alternating current supply terminal 306 through the drive motor 76 and the new closed contacts 320, 364 of the rewind limit switch 206, through the closed contacts of the safety switch 214 or the shorting contacts 360, 362 of the test push button switch, thence through the closed contacts of the on-off switch 266 to the other terminal 318 of the supply.

Simultaneously, with the activation of the drive motor 76, an alternating current circuit is completed from the supply terminal 306 through the rewind solenoid 150 and the closed contacts 344, 366 of the deactivated forward relay 326, thence through the closed contacts 320, 364 of the rewind limit switch 206 and the closed contacts of the safety switch 214 or the shunting test push button switch, through the on-off switch 266 to the other terminal 318 of the supply.

With the drive motor 76 rotating the shaft 90 and engaged rewind roll 136, and the rewind solenoid 150 activated to draw the rewind roll into frictional engagement with the peripheral flange 56 of the supply spool 18, the latter is caused to rotate in the rewind direction, thus transferring the magnetic tape 16 from the take-up spool 46 back to the supply spool.

Referring particularly to FIG. 4 of the drawings, it will be seen that the drive connections from the drive motor shaft 82 to the forward drive pressure roll 116 and to the rewind drive roll 136 are such that, with the given speed of rotation of the motor shaft, the speed of rotation of the spools in the rewind direction is much greater than in the forward feed direction. Although this ratio of speed may be varied as desired, it has been found that a ratio of ten is completely satisfactory.

The magnetic tape 16 thus is rewound upon the supply spool 18 to the starting position at which the roller 212 engages the rewind limit switch 206 and effects opening of the contacts 320, 364 and closure of the contacts 320, 322. Opening of the contacts 320, 364 breaks the circuit of the rewind solenoid 150 and the drive motor 76.

In the event of failure of switch 206 to inactivate the apparatus, the roller 212 will continue on to activate the safety switch 214. However, if the safety switch also fails to stop the drive motor 76, the end of the tape on the take-up spool 46 will be detached by release of the clip 72, as explained hereinbefore, to prevent damage to the motor. In addition, when the projection 222 on the timer section 172 has been rotated counterclockwise into abutment with the back side of the stop 224, the teeth 184 between the timer sections will slip, thus averting damage to the drive motor.

In the rewound condition of the tape, projection 222 on the timer clutch section 172 is displaced from the rewind start switch 218, thus closing the contacts 340, 342 and permitting completion of the direct current circuits of the forward relay coil 326 and forward solenoid 122, when the start switch 324 is depressed, as explained hereinbefore. Activation of the forward relay coil completes the alternating current circuit of the drive motor 76 through contacts 344, 346. Thus, the magnetic tape is driven in the forward direction, as explained hereinbefore.

With the test push button switch 262 depressed and the forward relay contacts 370, 372 closed, the output terminal 374 of the playback amplifier is connected through said closed contacts and the closed contacts 376, 378 of the test push button switch and the closed contacts 274, 276 of the released record push button switch 260, to the microphone-receiver terminal 280 of the telephone hand set. Accordingly, the recorded information message is played back, and at the end of the message the projection 222 on the timer clutch section 172 is returned into engagement with the rewind start switch 218. Opening of the contacts 340, 342 effects deenergization of the forward relay coil 326 and the forward solenoid 122.

However, at the end of the message playback the circuit of the drive motor 76 is completed through the closed contacts 320, 364 of the rewind limit switch, and the circuit of the rewind solenoid 150 is completed through the closed contacts 344, 366 of the deactivated forward relay coil 326. Thus, rewinding of the tape is initiated automatically with completion of the message. When rewinding of the tape is completed, opening of the contacts 320, 364 by the roller 212 deactivates the apparatus. Of course, rewinding may be halted by depressing the on-off push button 266.

With the information message thus recorded and reviewed, the apparatus is ready for automatic operation to receive incoming calls. For this purpose the automatic push button switch 264 is depressed, closing the contacts 380, 382. In the event the tape has not been rewound, closure of the contacts of the on-off switch 266, by depression of the automatic push button switch 264, completes the alternating current circuits of the drive motor 76 and rewind solenoid 150, as explained hereinbefore, to effect rewinding of the tape.

Closure of the contacts 380, 382 completes a circuit from the telephone line terminal 284 through said closed contacts and the closed contacts 370, 384 of the inactivated forward relay 326, thence through the ring-in motor 230 and the condenser 386 to the other terminal 282 of the telephone line.

Assuming that a calling party has completed the telephone line circuit, the telephone ringing voltage is applied through the condenser 386 to the ringing motor 230. Although the r.p.m. of the motor 230 may be chosen to effect one cycle of operation for any desired number of telephone rings, it has been found desirable to effect one cycle of motor operation for one long telephone ring or for two short telephone rings. In this manner the calling party will be answered by the apparatus after a normally expected time delay, and thus will not be startled by an immediate response.

Upon activation of the ring-in motor 230 for the predetermined time, the motor driven arm 242 will have been rotated counterclockwise (FIG. 11) from its rest position to the position at which the spring connector pin 250 has crossed the line extending through the tab 246 and shaft 234. The arm thereupon is rotated quickly to its rest position, by compression of spring 244, and in so rotating it engages the switch lever 254 and thus causes momentary closure of the switch contacts 390, 392. Since these contacts short the open manual start switch 324, they perform the same function as the latter in activating the forward solenoid and forward relay. Accordingly, the apparatus is activated to play out the information message in the same manner as in the test play back procedure described hereinbefore. In this instance, however, the output terminal 374 of the playback amplifier is connected to the telephone line terminal 284 through the closed contacts 380, 382 of the automatic push button switch 264, whereupon the information message on the magnetic tape is transmitted to the calling party.

Upon completion of the message the forward relay coil 326 and forward solenoid 122 are deenergized by opening of the contacts 340, 342 of the rewind start switch 218. The drive motor 76 remains energized, however, through the closed contacts 320, 364 of the rewind limit switch, and the circuit of the rewind solenoid 150 is completed through closed contacts 344, 366 of the deenergized forward relay coil 326. Thus, the magnetic tape is rewound to the starting position, preparatory to answering a subsequent call.

It is to be observed that, upon completion of the information message in answer to a call, the cycle will not repeat for that calling party because initiation of the cycle is made by closure of the automatic start switch contacts 390, 392. This switch is actuated only by operation of the ringing motor 230 in response to the ringing voltage on the telephone line.

It will be apparent to those skilled in the art that various changes may be made in the details of construction described hereinbefore without departing from the spirit of this invention and the scope of the appended claims.

Having now described our invention and the manner in which it may be used, what we claim as new and desire to secure by Letters Patent is:

1. In automatic telephone answering apparatus having audio recording and playback means including message recording means having a member movable in recording and playback direction and in return direction, and electrical drive means for moving said member in said directions: an electric record circuit for connecting the recording and playback means to a microphone output, an electric playback circuit for connecting the recording and playback means selectively to a receiver input and to a telephone line, electrical recording and playback drive control means and return drive control means for controlling the movement of said movable member in said respective directions, an electric circuit for each of said drive control means, return start switch means in the circuit of the playback drive control means, return start switch actuator means operable to terminate movement of the movable member in the playback direction when the recorded message has been played out, return limit switch means in the circuit of the return drive control means, return limit switch actuator means operable to terminate movement of the movable member in the return direction when said member has been returned to its starting position, timer clutch means releasably interconnecting the return start and limit switch actuator means, and electrical timer clutch actuator means operable during recording of a message to disconnect the return start and limit switch actuator means and operable during return and playback of the recorded message to interconnect said return start and limit switch actuator means.

2. The apparatus of claim 1 including switch means in the playback circuit, and switch actuator means including an electirc motor operable by the ringing voltage on the telephone line and having an electric circuit arranged for connection directly to the telephone line for actuation only by the ringing voltage on the telephone line upon connection of an incoming call.

3. The apparatus of claim 1 including spring means interengaging the return start and limit switch actuator means and operable when the latter are disconnected to return the return start switch actuator means to a normal rest position opening the return start switch.

4. In automatic telephone answering apparatus having a magnetic tape movable in forward and rewind directions by operation of electric forward and rewind solenoids each having an electric control circuit, wherein the control circuit of the forward solenoid includes rewind start switch means operable by rewind start switch actuator means and wherein the control circuit of the rewind solenoid includes rewind limit switch means operable by rewind limit switch actuator means, the combination therewith of relatively movable timer clutch sections each engaging one of the rewind start and limit switch actuator means, electrical timer clutch actuator means having an electric circuit and operable during recording of a message on the tape to separate the clutch sections and disconnect the rewind start and limit switch actuator means and operable during rewind and playback of the recorded message to interengage the clutch sections and interconnect said rewind start and limit switch actuator means, and spring means interengaging the clutch sections and operable when the latter are disconnected to return the rewind start switch actuator means to a normal rest position opening the rewind start switch means.

5. In automatic telephone answering apparatus having a magnetic tape movable in forward and rewind directions: supply and take-up spools supported coaxially for independent rotation and each supporting opposite ends of the tape, one of the spools having a hollow central portion facing the other spool, and a coil spring confined within the hollow spool and surrounding the axis of rotation of the spools, one end of the spring engaging one of the spools and the other end of the spring engaging the other spool, whereby rotation of one of the spools effects rotation of the other spool in the same direction and at a speed dependent upon the relative diameters of tape coils on the spools.

6. In automatic telephone answering apparatus having electrical audio output means and an electric circuit for connecting it to a telephone line supplying a ringing voltage: switch means in the output circuit, and switch actuator means including an electric motor operable by telephone line ringing voltage and having an electric circuit arranged for connection directly to the telephone line for actuation only by the ringing voltage on the telephone line upon connection of an incoming call, the motor having a rotary driven shaft, abutment means rotatable by the shaft, rotary arm means mounted for engagement by the abutment means, and resilient means engaging the arm means for returning the latter to a normal rest position after a predetermined rotation thereof by the abutment means, the rotary arm means being arranged during its rotation to engage the switch means.

References Cited by the Examiner

UNITED STATES PATENTS

| | | | |
|---|---|---|---|
| 1,118,689 | 11/1914 | Sharlow | 242—74.2 |
| 1,738,551 | 12/1929 | Zullo | 179—6 |
| 2,109,627 | 3/1938 | Finch | 242—74.2 |
| 2,118,944 | 5/1938 | Purdy | 192—142 |
| 2,378,997 | 6/1945 | Gainer | 242—77 |
| 2,536,939 | 1/1951 | Johnson | 242—77 |
| 2,673,242 | 3/1954 | Deventer | 179.6 |
| 2,737,278 | 3/1956 | Bartelt | 192—142 |
| 2,743,315 | 4/1956 | Deventer | 179—6 |
| 2,793,252 | 5/1957 | Augustadt | 179—6 |
| 2,869,799 | 1/1959 | Hunter | 242—55.13 |
| 2,927,975 | 3/1960 | Jamieson | 179—100.2 |
| 2,943,804 | 7/1960 | Loewe | 242—55.12 |
| 2,946,902 | 7/1960 | Hagen | 200—35 |
| 2,952,415 | 9/1960 | Gilson | 242—55.12 |

FOREIGN PATENTS

| | | |
|---|---|---|
| 732,718 | 6/1955 | Great Britain. |

IRVING L. SRAGOW, *Primary Examiner.*

L. MILLER ANDRUS, THOMAS B. HABECKER, *Examiners.*